United States Patent
Tschirhart et al.

(10) Patent No.: US 9,484,816 B2
(45) Date of Patent: Nov. 1, 2016

(54) CONTROLLABLE ON-TIME REDUCTION FOR SWITCHING VOLTAGE REGULATORS OPERATING IN PULSE FREQUENCY MODULATION MODE

(71) Applicant: Infineon Technologies Austria AG, Villach (AT)

(72) Inventors: Darryl Tschirhart, Torrance, CA (US); Benjamim Tang, Rancho Palos Verdes, CA (US); Richard Pierson, Newport Beach, CA (US)

(73) Assignee: Infineon Technologies Austria AG, Villach (AT)

( * ) Notice: Subject to any disclaimer, the term of this patent is extended or adjusted under 35 U.S.C. 154(b) by 124 days.

(21) Appl. No.: 14/299,430

(22) Filed: Jun. 9, 2014

(65) Prior Publication Data

US 2015/0357913 A1 Dec. 10, 2015

(51) Int. Cl.
*H02M 1/00* (2006.01)
*H02M 3/158* (2006.01)
*H02M 3/156* (2006.01)

(52) U.S. Cl.
CPC ............ *H02M 3/158* (2013.01); *H02M 3/156* (2013.01); *H02M 3/1584* (2013.01); *H02M 3/1588* (2013.01); *H02M 2001/0032* (2013.01); *Y02B 70/1466* (2013.01); *Y02B 70/16* (2013.01)

(58) Field of Classification Search
CPC ................. H02M 2001/0032; H02M 3/1588; H02M 2001/0019; H02M 3/156; H02M 3/158
See application file for complete search history.

(56) References Cited

U.S. PATENT DOCUMENTS

| 2009/0174379 A1 | 7/2009 | Lima et al. |
| 2012/0223691 A1 | 9/2012 | Weinstein et al. |
| 2012/0223693 A1* | 9/2012 | Tang ............... H02M 3/157 323/283 |

FOREIGN PATENT DOCUMENTS

DE 102013109100 A1 4/2014

OTHER PUBLICATIONS

Unknown, "600 kHz PWM/PFM Step-Down DC-DC Controller", Semiconductor Components Industries, LLC, on Semiconductor, NCP1550, http://onsemi.com, Jul. 2006, pp. 1-17.

(Continued)

*Primary Examiner* — Adolf Berhane
*Assistant Examiner* — Henry Lee, III
(74) *Attorney, Agent, or Firm* — Murphy, Bilak & Homiller, PLLC

(57) ABSTRACT

A switching voltage regulator includes a power stage for delivering output current to a load through an inductor. The power stage has a high-side transistor and a low-side transistor. The switching voltage regulator also includes a controller for setting the power stage in a PFM (pulse frequency modulation) switching mode if the output current decreases below a first threshold. Each period of the PFM switching mode includes an on-time during which the high-side transistor is on and the low-side transistor is off, an off-time during which the low-side transistor is on and the high-side transistor is off and a HiZ-time during which the high-side transistor and the low-side transistor are both off. The controller varies the on-time of the PFM switching mode responsive to a change in the output current.

7 Claims, 8 Drawing Sheets

(56) References Cited

OTHER PUBLICATIONS

Unknown, "FAN5358 2MHz, 500mA, SC70 Synchronous Buck Regulator", Fairchild Semiconductor Corporation, www.fairchildsemi.com, Mar. 2014, pp. 1-13.

Unknown, "TPS8269x High-Efficiency MicroSIP Step-Down Converter", Texas Instruments Incorporated, Mar. 2014, www.ti.com, Dallas, Texas, pp. 1-31.

* cited by examiner

CONTROLLABLE ON-TIME REDUCTION FOR SWITCHING VOLTAGE REGULATORS OPERATING IN PULSE FREQUENCY MODULATION MODE

TECHNICAL FIELD

The present application relates to switching voltage regulators, in particular pulse frequency operation mode for switching voltage regulators.

BACKGROUND

Switching voltage regulators are widely used in modern electronic systems for a variety of applications such as computing (server and mobile) and POLs (Point-of-Load Systems) for telecommunications because of their high efficiency and small amount of area/volume consumed by such converters. Widely accepted switching voltage regulator topologies include buck, boost, buck-boost, forward, flyback, half-bridge, full-bridge, and SEPIC topologies. Multiphase buck converters are particularly well suited for providing high current at low voltages needed by high-performance integrated circuits such as microprocessors, graphics processors, and network processors. Buck converters are implemented with active components such as a pulse width modulation (PWM) controller IC (integrated circuit), driver circuitry, one or more phases including power MOSFETs (metal-oxide-semiconductor field-effect transistors), and passive components such as inductors, transformers or coupled inductors, capacitors, and resistors. Multiple phases (power stages) can be connected in parallel to the load through respective inductors to meet high output current requirements.

Losses in switching voltage regulators can be broadly categorized as conduction losses and frequency-dependent losses. At light-load conditions, frequency-dependent losses dominate and cause a steep efficiency roll-off when standard pulse width modulation (PWM) control is employed for output voltage regulation. To maintain high efficiency even at very light load, a control technique known as pulse frequency modulation (PFM) is typically used. PFM is usually entered when the regulator output current reduces past the critical conduction current, which is half the inductor ripple current. The on-time is typically set at the critical conduction point based on the inductance value, input voltage and output voltage. While this offers efficiency improvements over PWM control, the relatively large on-time causes increased ripple voltage and less than optimal efficiency as the output current reduces. For switching voltage regulators used in computing applications, voltage ripple is limited by industry-standard specifications to limit power loss in central processing units (CPUs), field programmable gate arrays (FPGAs), or other digital devices. In order to meet a specified voltage ripple, the PFM entry current is typically limited which in turn sacrifices efficiency for ripple voltage performance. High light-load efficiency is desirable as it results in financial savings for data centers and home users, or increased battery life in mobile applications.

The use of PFM is a standard technique for achieving high efficiency at light-load conditions. Many conventional PFM approaches use a constant PFM on-time. However, constant PFM on-time causes the output voltage ripple to increase over PFM operation.

SUMMARY

According to an embodiment of a method of controlling a switching voltage regulator that includes a power stage for delivering output current to a load through an inductor, the method comprises: setting the power stage in a PFM (pulse frequency modulation) switching mode if the output current decreases below a first threshold, each period of the PFM switching mode including an on-time during which a high-side transistor of the power stage is on and a low-side transistor of the power stage is off, an off-time during which the low-side transistor is on and the high-side transistor is off and a HiZ-time during which the high-side transistor and the low-side transistor are both off; and varying the on-time of the PFM switching mode responsive to a change in the output current.

According to an embodiment of a switching voltage regulator, the regulator comprises a power stage and a controller. The power stage is configured to deliver output current to a load through an inductor, and comprises a high-side transistor and a low-side transistor. The controller is operable to set the power stage in a PFM (pulse frequency modulation) switching mode if the output current decreases below a first threshold. Each period of the PFM switching mode includes an on-time during which the high-side transistor is on and the low-side transistor is off, an off-time during which the low-side transistor is on and the high-side transistor is off and a HiZ-time during which the high-side transistor and the low-side transistor are both off. The controller is further operable to vary the on-time of the PFM switching mode responsive to a change in the output current.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein reduce output voltage ripple for a switching voltage regulator while gaining efficiency improvements in PFM (pulse frequency modulation) mode of operation, by varying the PFM on-time of the switching voltage regulator responsive to changes in the load. The embodiments provide flexibility by allowing the user to select if and when the on-time is varied in PFM operation. This allows system-specific optimization to be achieved.

Figure 1:
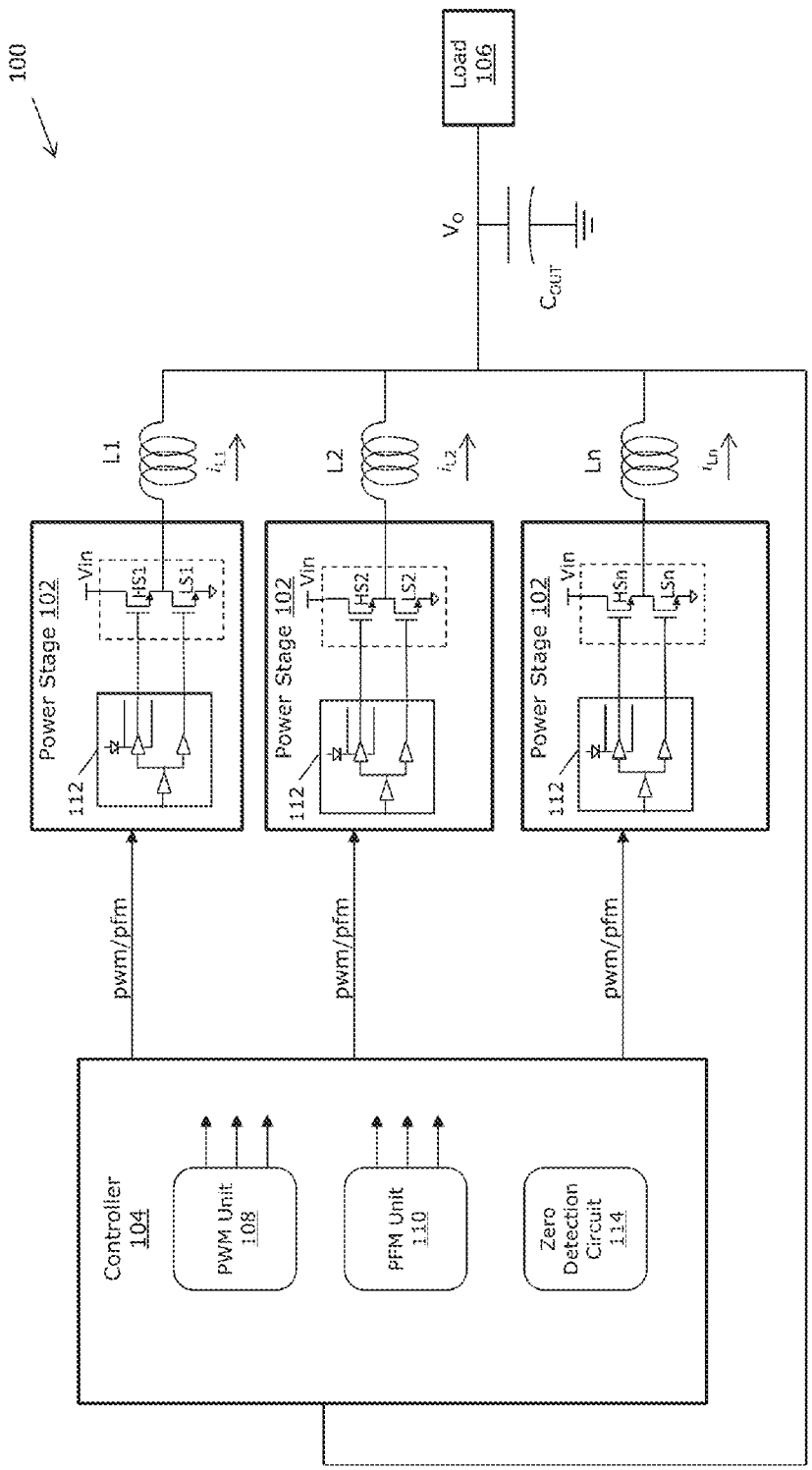
FIG. 1 illustrates a block diagram of an embodiment of a multiphase switching voltage regulator having variable on-time in pulse frequency modulation mode.

FIG. 1 illustrates an embodiment of a switching voltage regulator 100 comprising a plurality of power stages 102 and a controller 104 such as a microcontroller, microprocessor, ASIC (application-specific integrated-circuit), etc. for controlling operation of the power stages 102. Each power stage 102 is operable to deliver a phase current ($i_{L_n}$) through a separate inductor ($L_n$) to a load 106 connected to the switching voltage regulator 100 via the inductors and an output capacitor ($C_{OUT}$). The load 106 can be a high-performance integrated circuit such as a microprocessor, graphics processor, network processor, etc. or other type of integrated circuit requiring voltage regulation such as a POL (point-of-load).

Each power stage 102 has a high-side transistor (HSn) and a low-side transistor (LSn) for coupling to the load 106 through the corresponding inductor. The high-side transistor of each power stage 102 switchably connects the load 106 to an input voltage (Vin) of the switching voltage regulator 100, and the corresponding low-side transistor switchably connects the load 106 to ground at different periods. N power stages 102 are shown in FIG. 1. The switching voltage regulator 100 can include any number of power stages 102 including a single power stage (phase) or more than one power stage (i.e. multi-phase where each power stage is one phase of the multi-phase regulator).

In each case, the controller 104 regulates the voltage ($V_O$) delivered to the load 106 by the power stage(s) 102, by adjusting the phase currents delivered to the load 106. The controller 104 includes a pulse width modulator (PWM) unit 108 for switching each power stage 102 via a corresponding PWM control signal (pwm) in CCM (continuous conduction mode) so that the power stage(s) 102 source or sink current to the load 106 through the corresponding inductor and the high-side or low-side transistor. When the PWM control signal is at a logic level high, the high-side transistor is placed in a conductive state, the inductor current is sourced or sunk through the high-side transistor, and the current through the inductor increases for the duration. This is generally referred to as 'on-time' and the power stage 102 is considered to be 'turned on'. When the PWM control signal is at a logic level low, the low-side transistor is placed in a conductive state, current is sourced or sunk from the low-side transistor, and the current through the inductor decreases for the duration. This is generally referred to as 'off-time' and the power stage 102 is considered to be 'turned off'.

The controller 104 also includes a pulse frequency modulator (PFM) unit 110 for switching one of the power stages 102 via a corresponding PFM (pfm) control signal in DCM (continuous conduction mode). In DCM, switching ripple in the inductor current or capacitor voltage causes the polarity of the applied switch current or voltage to reverse and the low-side transistor is not allowed to be conductive when the inductor current is zero. At the start of a DCM switching period, the high-side transistor (HSn) of the corresponding power stage 102 is turned on. At the time when the inductor current ($i_L$) reaches a peak value $i_{pk}$, the high-side transistor is typically turned off and the low-side transistor (LSn) is turned on. The low-side transistor is then turned off at the time when the inductor current drops to zero. Both the high-side and low-side transistors are off for the remainder of the switching period which is referred to herein as HiZ time. To regulate the DC output voltage (Vo), the controller 104 varies the switching frequency $f_S=1/T_S$ of the power stage(s) 102. The variable-frequency control method described herein is commonly referred to as pulse frequency modulation (PFM).

Each PFM switching period or cycle comprises an on-time, followed by an off-time, followed by the HiZ time as explained above. During the HiZ time, the inductor current is zero and does not change for the duration of the cycle. Also during the HiZ time, the load current is supplied from the output capacitor ($C_{OUT}$), causing the output voltage to decrease over time, the slope being dependent on the output current. A standard control method is to use a comparator to detect when the output voltage has dropped below a target regulation voltage. At this time the controller 104 exits HiZ and enters the on-time of the next switching period, increasing the inductor current and keeping the output voltage from dropping any further. This type of PFM scheme is typically referred to as 'valley' control, since it tries to maintain a minimum voltage at the output by varying the frequency of the pulses as a function of the output load current.

In either CCM or DCM mode of operation, drivers 112 of the power stage(s) 102 provide gate drive signals to the gates of the corresponding high-side and low-side transistors in response to the PWM or PFM control signals provided by the controller 104. The activation state of each power stage 102 and the duty cycle of the high-side and low-side transistors are determined at least in part based on the output voltage ($V_O$) applied to the load 106 so that the switching voltage regulator 100 can react as quickly and reliably as possible to changing load conditions.

The controller 104 can manage changes from one reference voltage to another. The controller 104 can also determine errors between the output voltage ($V_O$) and a reference voltage, and convert the error voltage into a digital representation provided to the PWM and PFM units 108, 110 for modifying the switching cycle of each power stage 102 e.g. by adjusting the PWM duty cycle in CCM mode of operation or switching frequency in DCM.

More particularly with regard to the DCM mode of operation, the PFM unit 110 can vary the on-time (Ton) of the switching voltage regulator 100 as the load current changes in order to reduce output voltage ripple while gaining efficiency improvements in PFM operation. In some embodiments, the PFM unit 110 varies the PFM on-time responsive to a change in the regulator output current ($I_O$) by estimating the output current and varying the on-time of the PFM switching mode responsive to a change in the output current estimate. In other embodiments, the PFM unit 110 varies the PFM on-time responsive to a change in the HiZ-time, frequency or period of the PFM switching mode. In each case, the PFM on-time does not necessarily remain fixed in the PFM switching mode.

Figure 2:
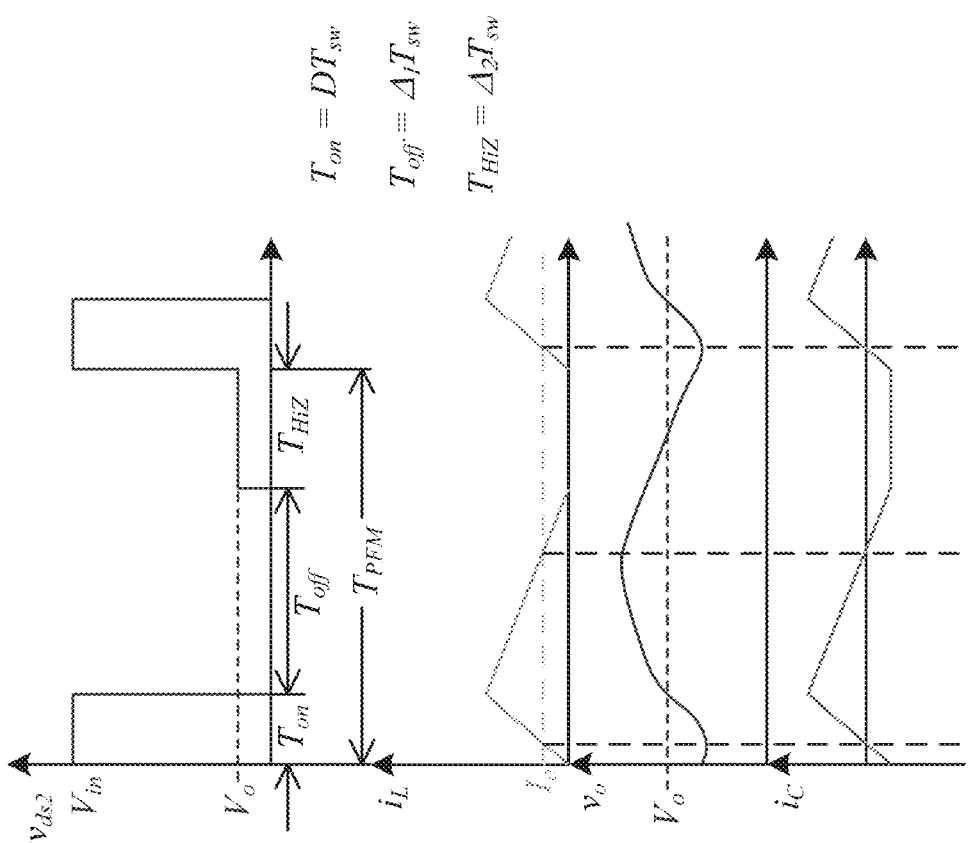
FIG. 2 is a plot diagram illustrating various waveforms associated with pulse frequency modulation mode of a switching voltage regulator.

FIG. 2 shows corresponding PFM waveforms associated with DCM operation of the switching voltage regulator 100. While the inductor current ($i_L$) is greater than the output current ($I_o$) during portions of the PFM on and off intervals, the output capacitor is charged (i.e. positive capacitor current $i_c$) and the output voltage (Vo) rises. The output voltage decreases when the inductor current is less than the output current as the capacitor is supplying the load (i.e. negative capacitor current).

During PFM switching in DCM mode of operation, each switching period or cycle comprises an on-time (Ton), followed by an off-time (Toff), followed by the HiZ time ($T_{HIZ}$). The controller 104 can calculate an initial PFM on-time using a weighed sum of two on-time calculations. The controller 104 can also calculate an initial PFM off-time based on the initial PFM on-time value as given by:

$$T_{off} = \Delta_1 T_{sw} = \left(\frac{V_{in}}{V_o} - 1\right) DT_{sw} \quad (1)$$

which is the general equation true for any PFM implementation. In equation (1), Toff is independent of load, meaning once Ton is selected, Toff is predetermined. Alternatively, the controller 104 can include a zero current detection circuit 114 and the output current estimate can be uniquely defined by the time required to slew the inductor current to zero.

In each case, the actual output current during PFM switching is given by:

$$I_o = \frac{I_{pk}}{2}\left(\frac{DT_{sw} + \Delta_1 T_{sw}}{T_{sw}}\right) \quad (2)$$

$$I_o = \frac{I_{pk}}{2}\left(\frac{D + \Delta_1}{D + \Delta_1 + \Delta_2}\right)$$

where $I_{pk}$ is the peak inductor current, $DT_{sw}$ is the on-time of the high side transistor, $\Delta_1 T_{sw}$ is the off-time (i.e. low-side transistor on and high-side transistor off), and $\Delta_2 T_{sw}$ is the HiZ time. These general equations are applicable to any PFM implementation.

In one embodiment, current is not measured in PFM operation. According to this embodiment, the actual value of $I_{pk}$ is unknown. The PFM on- and off-times are calculated by the controller 104 based on $V_{in}$, $V_o$, and L. The peak current can be calculated by the controller 104 as given by:

$$I_{pk} = \frac{V_{in} - V_o}{L} DT_{sw} \quad (3)$$

Alternatively, the PFM on-time can be calculated based on the input voltage ($V_{in}$), output voltage ($V_o$), inductance (L), and output current ($I_o$). For example, equations (2) and (3) can be manipulated to solve for the PFM on-time ($DT_{sw}$) as a function of $V_{in}$, $V_o$ and $I_o$. In yet another embodiment, the PFM on-time can be calculated based on $V_{in}$, $V_o$, L, and peak inductor current ($I_{pk}$) by re-writing equation (3) to solve for $DT_{sw}$ as a function of $V_{in}$, $V_o$ and $I_{pk}$.

Regardless, substitution of equation (3) into equation (2) yields:

$$I_o = \frac{V_{in} - V_o}{2L} DT_{sw}\left(\frac{DT_{sw} + \Delta_1 T_{sw}}{DT_{sw} + \Delta_1 T_{sw} + \Delta_2 T_{sw}}\right) \quad (4)$$

Equation (4) allows instantaneous, peak, and cycle-averaged output current to be estimated based on measured or known input and output voltages and inductance value e.g. stored in a register of the controller 104, PFM frequency, period, or on-time, off-time, and HiZ time. Since the PFM period, on-time, off-time, and HiZ time are interdependent, only two of the four variables need to be known or measured in order to estimate the output current.

Isolating the HiZ time in equation (2) yields:

$$T_{HiZ} = \Delta_2 T_{sw} = \frac{(DT_{sw} + \Delta_1 T_{sw})(I_{pk} - 2I_o)}{2I_o} \quad (5)$$

where the peak inductor current $I_{pk}$ is calculated using measured voltages, a known inductance value and calculated PFM on-time in accordance with equation (4).

The controller 104 regulates the output voltage (Vo) by allowing the HiZ time to vary. The HiZ time ends and another on-time interval begins when the output voltage falls to a specified level and triggers a comparator. During the off-time interval, the inductor current falls below the output current and the output capacitor provides the difference. When the inductor current reaches zero, the capacitor provides the entire load current. The higher the load current, the faster the capacitor voltage falls and triggers the comparator. Therefore, the HiZ time is inversely proportional to load current.

Heavy load demand translates to higher operating frequency, while load reduction leads to a decrease in operating frequency due to slower discharge of the output capacitor during HiZ time. From equation (2), output current is the average of inductor current which is the area under the triangular current waveform ($i_L$) in FIG. 2 divided by the total PFM period ($T_{PFM}$=Ton+Toff+$T_{HIZ}$). Reducing the PFM period $T_{PFM}$ increases the supported output current. The shortest possible PFM period $T_{PFM}$ consists of an on/off cycle with no HiZ time and corresponds to the maximum supported output current. Setting $\Delta_2$=0 in equation (2) gives $I_{o,max}$=$I_{pk}$/2.

The switching voltage regulator 100 has several power loss mechanisms in the PFM mode of operation. Conduction loss (Pcond) through the high-side and low-side transistors of a power stage 102 and the corresponding inductor is given by:

$$P_{cond} = \frac{I_{pk}^2}{3}[DR_{dsHS} + \Delta_1 R_{dsLS} + (D + \Delta_1)DCR] \quad (6)$$

where $R_{dsHS}$ is the on-state resistance of the high-side transistor (e.g. the drain-to-source resistance of a MOSFET), $R_{dsLS}$ is the on-state resistance of the low-side transistor and DCR is the non-ideal DC resistance of the inductor.

The act of switching the high-side and low-side transistors on and off results in gate loss (Pgate) given by:

$$P_{gate} = k_g(Q_{gHS} + Q_{gLS})V_{gs}F_{PFM} \quad (7)$$

where $k_g$ is a scaling term (typically between 1.5 to 2) that accounts for losses in the driver circuit.

Switching loss (Psw) of the high-side transistor is given by:

$$P_{sw} = \frac{1}{2}V_{in}I_{pk}t_{fHS}F_{PFM} \quad (8)$$

where $t_{fHS}$ is the fall-time of the current in the high-side transistor i.e. the time to turn off the high-side transistor.

The diode loss (Pdiode) of the low-side transistor during the dead-time between the two devices is given by:

$$P_{diode} = I_{pk}V_{F,LS}(I_{pk})t_dF_{PFM} \quad (9)$$

where the forward voltage of the diode, $V_{F,LS}$, increases with the current through the diode.

The core switching loss (Pcore) is given by:

$$P_{core} = k_c I_{pk}^x F_{PFM}^y \qquad (10)$$

where $k_c$, x, and y are constants typically provided in datasheets. Parameters x and y are greater than 1, but typically less than 2.5.

Conduction loss (Pcond) is the only loss mechanism independent of PFM frequency $F_{PFM}$, and gate loss (Pgate) is the only loss mechanism independent of peak inductor current $I_{pk}$. The other loss mechanisms are dependent on both PFM switching frequency and peak current.

The controller 104 sets each power stage 102 of the switching voltage regulator 100 in PFM switching mode if the output current (Io) decreases below a first threshold. The first threshold can be selected as an efficient switchover point, whereby the regulator 100 operates more efficiently in PFM mode below the first threshold and more efficiently in PWM mode above the first threshold. The controller 104, e.g. via the PFM unit 110, varies the PFM on-time (Ton) responsive to a change in an estimate of the output current. That is, the controller 104 scales or otherwise adjusts the PFM on-time to reduce the peak current with load which in turn reduces the loss components that are functions of $I_{pk}$. The controller 104 can estimate the output current for a single cycle or average over multiple cycles. The controller 104 can estimate the output current by sensing the current ($I_L$) through the inductor, sensing the current through the power stage 102 (e.g. high-side, low-side, ground or input current), sensing the current though a shunt resistor (not shown) in series with the inductor (where the voltage of the shunt resistor is measured), etc.

The controller 104 can determine when to vary on-time in PFM mode and when to fix the on-time based on the loss mechanisms explained above in connection with equations (6)-(10). For example, the controller 104 can reduce the PFM on-time until the output current estimate decreases to a minimum threshold. Below this point, the controller 104 can fix the PFM on-time so that the PFM on-time remains constant in PFM mode while the output current estimate remains below the minimum threshold. The minimum threshold can be selected based on an efficiency target or output voltage ripple target for the switching voltage regulator 100. The implications of this approach are discussed in more detail next in connection with FIGS. 3-6.

The PFM on-time scaling limits can be determined by a maximum supported current associated with the reduced $T_{on}$ value. The ratio of supported current at reduced $T_{on}$ to maximum supported current at maximum $T_{on}$ is equal to a PFM on-time ratio. For example, if the maximum PFM current at $T_{on}$ is 10 A, then the maximum supported current at $0.5T_{on}$ is 5 A. The controller 104 e.g. via the PFM unit 110 can reduce the PFM on-time so as to maintain, in the PFM switching mode, a fixed ratio between the peak current and output current without measuring the actual output current or inductor current.

With regard to efficiency, there is some operating point that minimizes the power losses by optimizing the peak current value and PFM frequency. The power losses are dependent on the components used in the implementation of the switching voltage regulator 100. Therefore, any equation to determine the optimal operating point is a function of circuit parameters. It follows that different designs may have different PFM entry currents (boundary between CCM and PFM), and different load currents where PFM scaling results in efficiency improvements. By allowing the user to select these transition points, optimization is achievable for any design.

The magnitude of output voltage ripple is determined by the difference between peak current ($I_{pk}$) and output current ($I_o$), the PFM on-time of the high-side transistor (DTsw), the ratio of input to output voltage, and capacitance (Co) as given by:

$$\Delta v_o = \frac{(I_{pk} - I_o)\left(1 - \frac{I_o}{I_{pk}}\right) V_{in} DT_{sw}}{2V_o C_o} \qquad (11)$$

The output voltage ripple is a result of a pulse of energy during a PFM on/off interval, and is not a function of the HiZ time. As the load reduces, the $I_{pk}$-$I_o$ difference increases, causing the output voltage ripple to increase. Then the reduction of $T_{on}$=$DT_{sw}$ reduces the ripple directly, but also reduces the $I_{pk}$-$I_o$ difference to further reduce voltage ripple. Therefore, the designer can opt to scale the PFM on-time ($T_{on}$) to achieve a reduction in output voltage ripple even if there is no efficiency gain for the particular application.

In one embodiment, the controller 104 e.g. via the PFM unit 110 continuously reduces the on-time of the PFM switching mode based on the output current estimate. Such a continuous scaling could provide much better performance, but only to a point.

Figure 3:
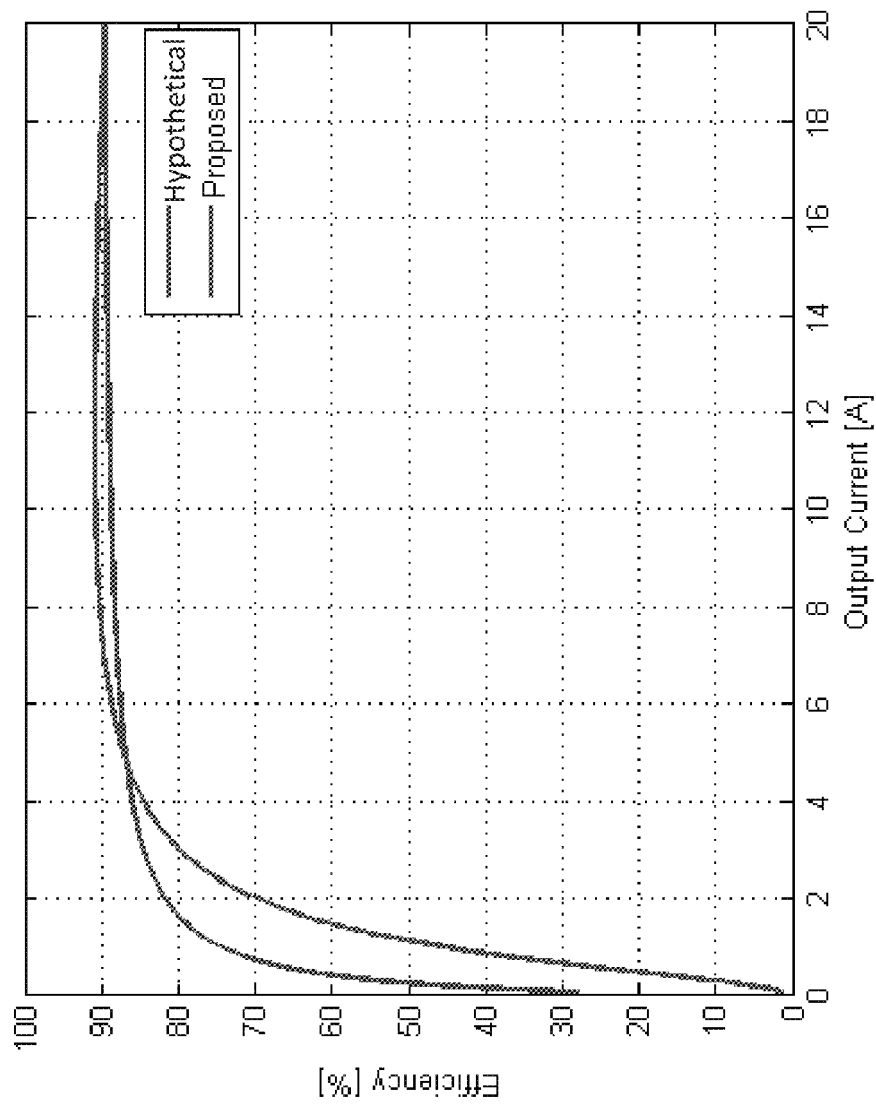
FIG. 3 is a plot diagram illustrating efficiency as a function of output current for a switching voltage regulator with and without variable on-time in pulse frequency modulation mode.

FIG. 3 plots the efficiency of a hypothetical system ("Hypothetical") with fixed PFM on-time and a system ("Proposed") with continuously scaled PFM on-time. In the proposed system with variable PFM on-time, the peak current is 45 A for 20 A out in this purely illustrative example (Vo=0.8V, L=150 nH, Cout=1333 μF). For the hypothetical system with fixed PFM on-time, the peak current is 45 A across the entire load in this example. For the proposed system, the on-time is continuously reduced to maintain the same peak/average current ratio of 45/20=2.25. Therefore at 10 A, the peak current is 22.5 A, at 5 A the peak current is 11.25 A, etc. By keeping the peak/average current ratio the same, the on-, off- and HiZ times are reduced with load current, meaning the PFM frequency increases. Above 5 A in this example, the net efficiency gain indicating the reduction of power losses due to peak current outweigh the increase in power losses due to frequency. However below 5 A in this example, the frequency dependent losses dominate and overshadow the savings from reduced peak current.

Figure 4:
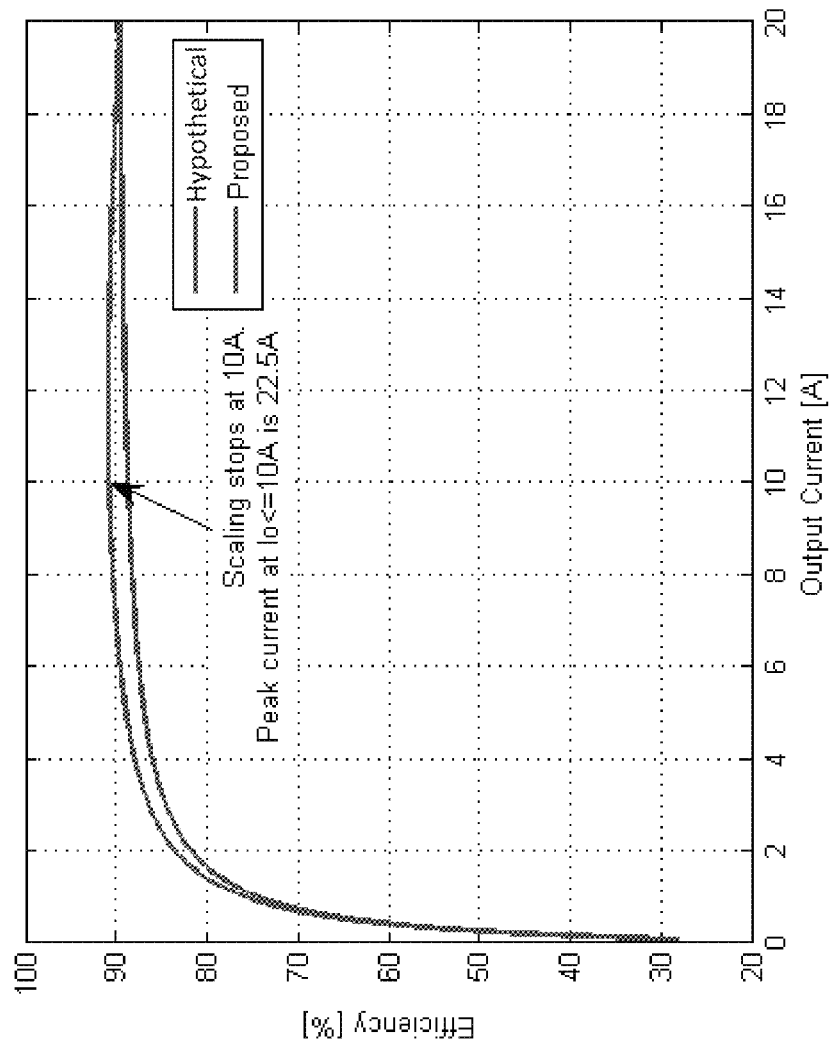
FIG. 4 is another plot diagram illustrating efficiency as a function of output current for a switching voltage regulator with and without variable on-time in pulse frequency modulation mode.

In FIG. 4, the PFM on-time is scaled continuously from 20 A down to 10 A in this purely illustrative example (Vo=0.8V, L=150 nH, Cout=1333 μF) to maintain the same peak/average current ratio of 2.25. However, from 10 A down to 0 A, the peak current is kept constant at 22.5 A. That is, the controller 104 fixes the PFM on-time responsive to the output current estimate decreasing to a minimum threshold (10 A in this example) below which the on-time remains constant. In this scenario, the scaled PFM on-time provides an efficiency improvement for the entire load range. The minimum threshold can be selected based on an efficiency target or output voltage ripple target for the switching voltage regulator 100. For example, the user can select the current to enter PFM operation as well as the corresponding peak current which dictates $T_{on}$. The scaling can be continuous down to a user-defined level that maintains an efficiency improvement or keeps light-load ripple at a desired level. The PFM on-time can remain constant below this point if desired.

Figure 5:
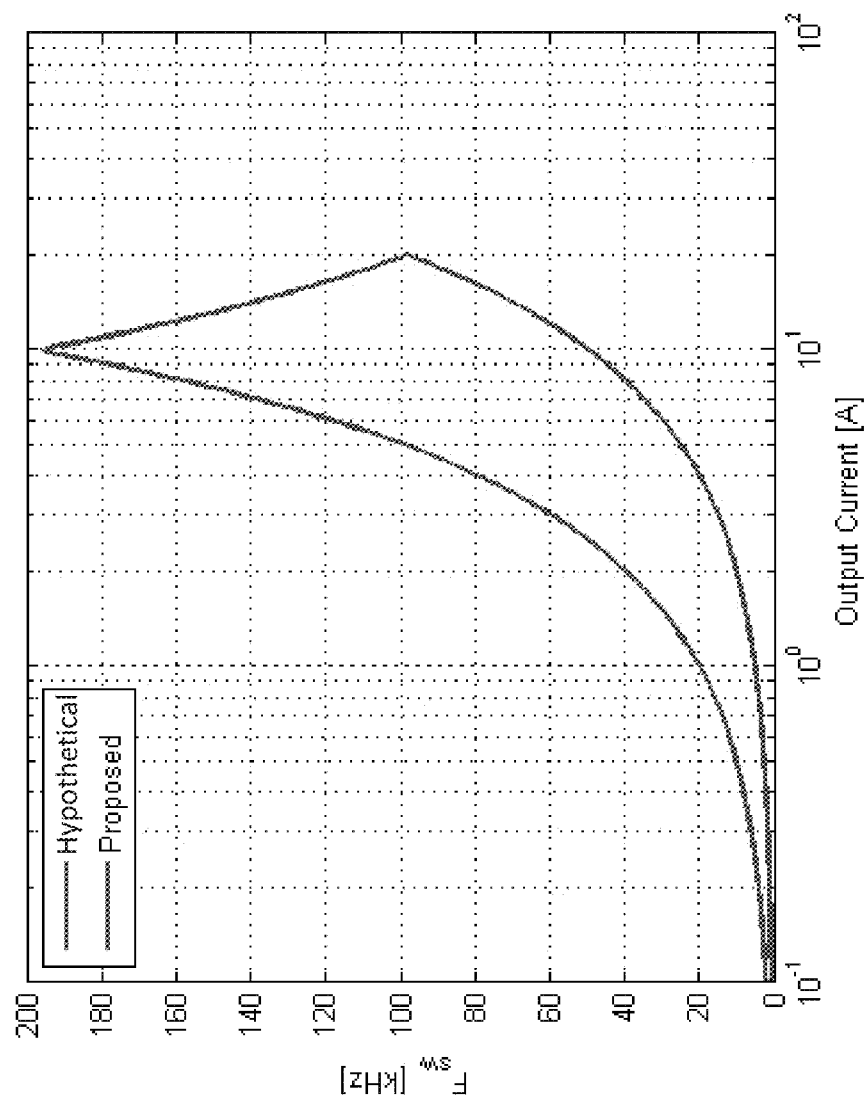
FIG. 5 is a plot diagram illustrating pulse frequency modulation mode of operation for a switching voltage regulator with and without variable on-time, controlled based on switching frequency.

In FIG. 5, the switching frequency (Fsw) of the system with scaled PFM on-time ("Proposed") is shown with continuous scaling down to 10 A. In this embodiment, the continuous reduction of the PFM on-time stops when the PFM frequency rises to a PFM switching frequency limit (195 kHz in this example). This switching frequency-based embodiment achieves the same as the HiZ-based embodiment described in connection with FIG. 4.

Figure 6:
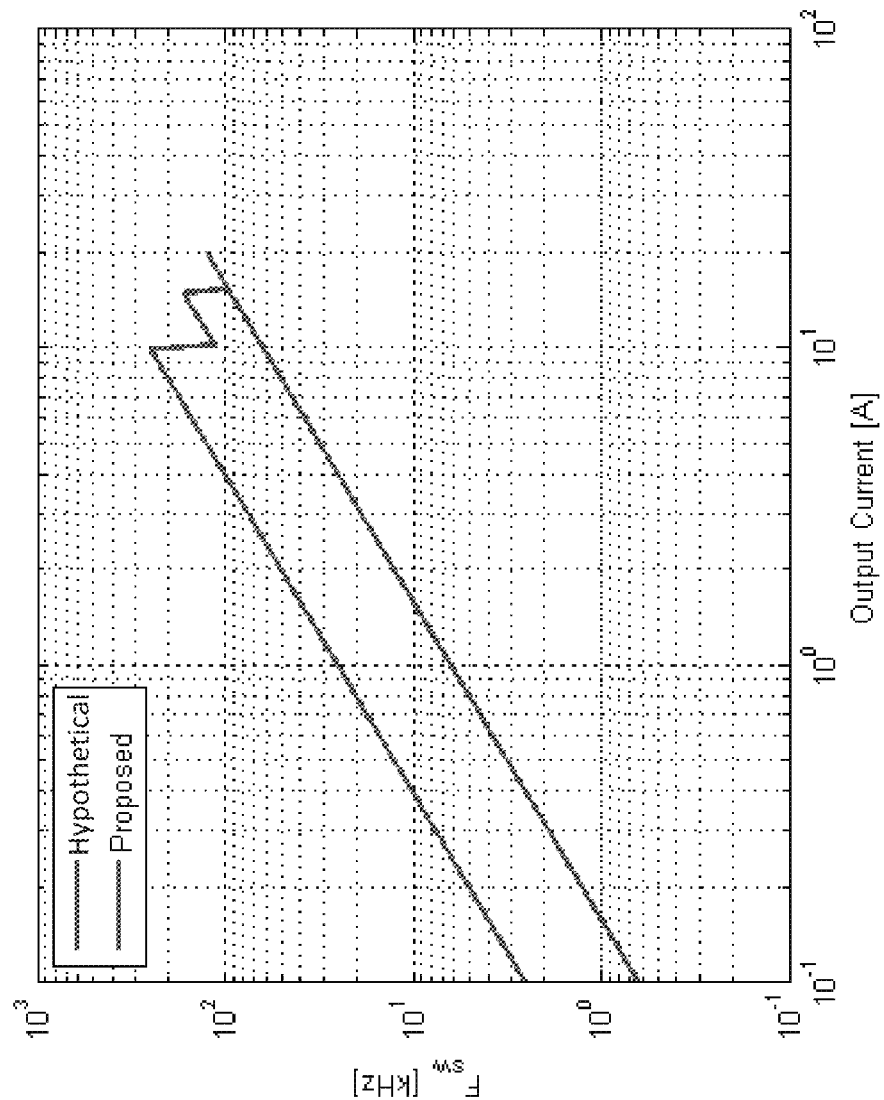
FIG. 6 is a plot diagram illustrating pulse frequency modulation mode of operation for a switching voltage regulator with and without variable on-time, implemented in discrete steps.

FIG. 6 shows another embodiment where the controller 104 e.g. via the PFM unit 110 reduces the on-time of the PFM switching mode in one or more discrete steps responsive to the output current estimate decreasing below at least a second threshold lower than the first threshold. The first threshold determines when operation of the switching changes from PWM to PFM as previously explained herein. In one implementation, the controller 104 reduces the PFM on-time by 25% from an initial on-time value responsive to the output current estimate decreasing to 75% of the first threshold (first step in the curve for the "Proposed" system in FIG. 6). The controller 104 reduces the PFM on-time by 50% from the initial on-time value responsive to the output current estimate decreasing to 50% of the first threshold (second step in the curve for the "Proposed" system in FIG. 6). That is, the full $T_{on}$ value can be stepwise reduced to 75% and then to 50%.

The user can select the current levels at which the on-time reduction occurs to achieve efficiency improvement and/or voltage ripple reduction, as limited by the current that the reduced on-time can support. For example, a user interface can present the scaling levels in terms of current and then use equation (5) to compute the HiZ time that must be measured/observed by the controller 104 before reducing $T_{on}$. The discrete-step PFM on-time reduction embodiment is a trade-off between ease of implementation versus efficiency benefit realization. In the purely illustrative example of FIG. 6, PFM operation mode is entered at 20 A and the PFM on-time is scaled at the earliest possible time. For example, $0.75T_{on}$ occurs at 75% load (15 A) and $0.5T_{on}$ occurs at half-load (10 A). PFM switching frequency could be used instead of HiZ time to decide when to switch to a reduced $T_{on}$ value as previously described herein in connection with FIG. 5.

In any implementation, knowledge of the HiZ time, frequency or current can be used to decide when to scale the PFM on-time.

Figure 7:
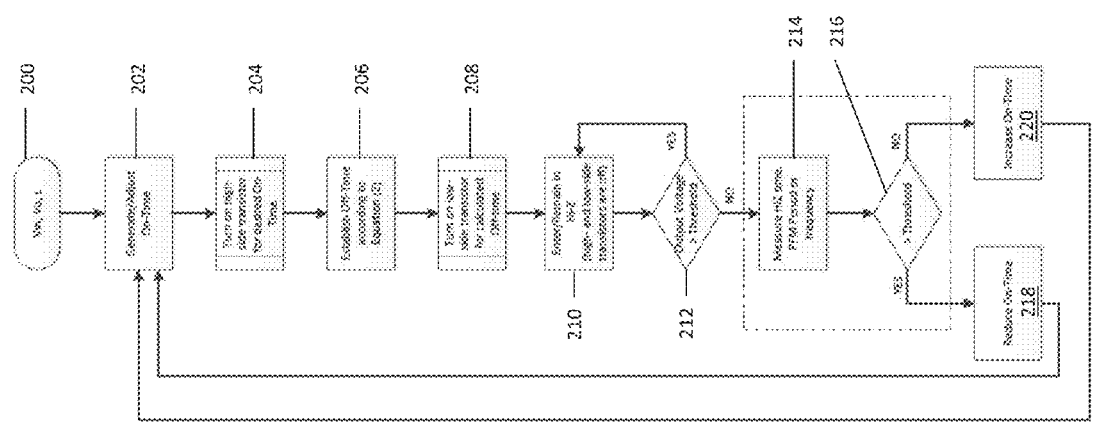
FIG. 7 is a flow diagram of an embodiment of a method of varying PFM on-time responsive to a change in HiZ-time, frequency or period of the PFM switching mode.

FIG. 7 illustrates an embodiment of a method of varying the PFM on-time responsive to a change in the HiZ-time, frequency or period of the PFM switching mode, where the period of the PFM switching mode $T_{SW}=T_{on}+T_{off}+T_{HIZ}$ and the PFM frequency equals $1/T_{SW}$. The controller 104 measures or otherwise has access to the regulator input voltage (Vin), output voltage (Vo) and inductance (L) information (Block 200). The controller 104 e.g. via the PFM unit 110 generates/adjusts the PFM on-time value (Block 202) e.g. in accordance with equation (1), and turns on the high-side transistor for the desired on-time (Block 204). The controller 104 establishes the PFM off-time value (Block 206) e.g. in accordance with equation (2), and turns on the low-side transistor for the calculated off-time (Block 208). The controller 104 then places the high-side and low-side transistors in the HiZ state, where they remain so long as the output voltage stays above a threshold (Blocks 210 and 212).

The controller 104 measures the HiZ-time, frequency and/or period of the switching PFM mode (Block 214). The controller 104 reduces the PFM on-time if the measured HiZ-time, frequency or period of the switching PFM mode exceeds a time/frequency threshold (Blocks 216 and 218). The controller 104 increases the PFM on-time if the measured HiZ-time, frequency or period of the switching PFM mode falls below the time/frequency threshold (Blocks 216 and 220). The time/frequency threshold can include some tolerance to avoid frequent perturbations in the PFM on-time. The controller 104 can fix the PFM on-time responsive to the measured HiZ-time, frequency or period of the switching PFM mode increasing to a maximum threshold value above which the on-time remains constant (e.g. 195 kHz in the example of FIG. 5).

Instead of varying the PFM on-time based on measuring the HiZ time, frequency or the period of the switching PFM mode, the controller 104 can measure or estimate the output current directly or indirectly. This can be accomplished through well-known power stage current measuring methods such as RDSon, DCR, current mirror, or shunt resistance measurements. In this way, the current measurement can be used to scale the PFM on-time without having to actually estimate the output current. For example, RDSon current sense measures the voltage across the low-side transistor (LS) when this transistor is in conduction, and the current is proportional to the voltage and inverse of the low-side transistor RDSon. DCR current sense measures the voltage across the inductor with an RC parallel network where the RC time constant matches the L/DCR time constant and the current is proportional to the voltage and inverse of the DCR. A current mirror generates a scaled mirror current from the high-side transistor (HS) and/or low-side transistor when conducting. A shunt resistor can be added in series to the power stage 102, generally between the inductor (L) and the load 106, and the voltage across the shunt resistor is proportional to the current.

Figure 8:
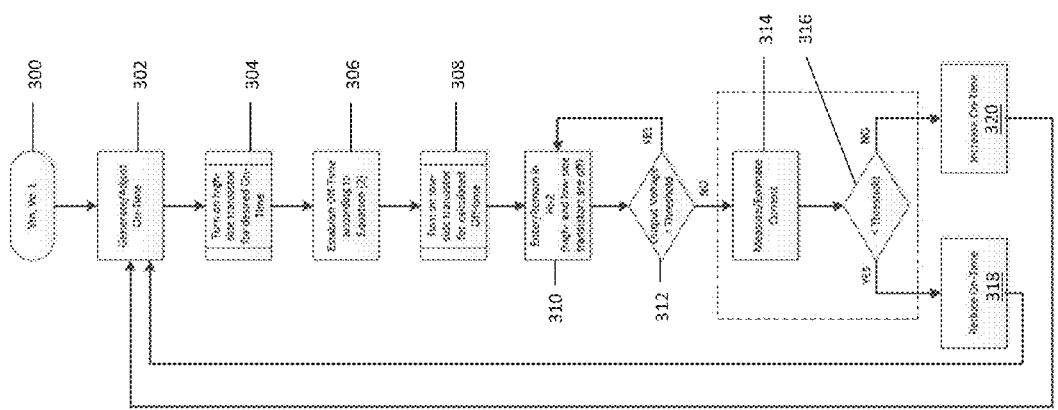
FIG. 8 is a flow diagram of an embodiment of a method of varying PFM on-time responsive to a change in an estimate of regulator output current.

FIG. 8 illustrates an embodiment of a method of varying the PFM on-time responsive to a change in an estimate of the regulator output current. The controller 104 measures or otherwise has access to the regulator input voltage (Vin), output voltage (Vo) and inductance (L) information (Block 300). The controller 104 e.g. via the PFM unit 110 generates/adjusts the PFM on-time value (Block 302) e.g. in accordance with equation (1), and turns on the high-side transistor for the desired on-time (Block 304). The controller 104 establishes the PFM off-time value (Block 306) e.g. in accordance with equation (2), and turns on the low-side transistor for the calculated off-time (Block 308). The controller 104 then places the high-side and low-side transistors in the HiZ state, where they remain so long as the output voltage stays above a threshold (Blocks 310 and 312).

The controller 104 measures or estimates the output current of the regulator (Block 314). For example, the controller 104 can measure the peak inductor current (Ipk) or the average inductor current. Alternatively, the controller 104 can estimate the regulator output current e.g. based on Vin, Vo and L or any other standard technique for switching voltage regulators. In each case, the controller 104 decreases the PFM on-time if the measured/estimated current falls below a current threshold (Blocks 316 and 318). The controller 104 increases the PFM on-time if the measured/estimated current exceeds the current threshold (Blocks 316 and 320). The current threshold can include some tolerance to avoid frequent perturbations in the PFM on-time. The controller 104 can fix the PFM on-time responsive to the measured/estimated current decreasing to a minimum threshold value below which the on-time remains constant.

In each case, PFM on-time scaling can be continuous or discrete. Giving the designer flexibility to select scaling conditions allows efficiency and/or ripple optimization for any system. System designers can fine-tune reduction settings to optimize the performance of each system. PFM on-time scaling also reduces acoustic noise. With the conventional fixed PFM on-time approach, regulator operation crosses into the audible range around 4 A. The energy in the inductor that causes vibration is $0.5LI_{pk}^2 = 0.5(150\ nH)(45^2) = 151.875$ uJ. With the PFM on-time reduction techniques described herein, the PFM frequency crosses into the audible range at 1 A, with a peak inductor current of 22.5 A storing 37.96875 uJ of energy in the inductor. By scaling the PFM on-time, the audible range is entered at a lower current (and therefore less likely and less frequently), but also with a quarter of the energy.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of controlling switching voltage regulator that includes a power stage for delivering output current to a load through an inductor, the method comprising:
   setting the power stage in a PFM (pulse frequency modulation) switching mode if the output current decreases below a first threshold, each period of the PFM switching mode including an on-time during which a high-side transistor of the power stage is on and a low-side transistor of the power stage is off, an off-time during which the low-side transistor is on and the high-side transistor is off and a HiZ-time during which the high-side transistor and the low-side transistor are both off; and
   varying the on-time of the PFM switching mode responsive to a change in the output current, by:
      increasing the on-time of a PFM pulse from the preceding PFM pulse if the time between the PFM pulses is shorter than a first expected period: and
      decreasing the on-time of the PFM pulse from the preceding PFM pulse if the time between the PFM pulses is longer than a second expected period.

2. The method of claim 1, wherein the on-time of the PFM switching mode is varied so as to maintain, in the PFM switching mode, a fixed ratio between a peak current of the inductor and the output current without measuring the actual output current or inductor current.

3. The method of claim 1, further comprising:
   fixing the on-time of the PFIVI switching mode responsive to the HiZ-time, frequency or period of the PFM switching mode increasing to a maximum threshold above which the on-tune remains constant.

4. A switching voltage regulator, comprising:
   a power stage configured to deliver output current to a load through an inductor, the power stage comprising a high-side transistor and a low-side transistor; and
   a controller operable to:
   set the power stage in a PM (pulse frequency modulation) switching mode if the output current decreases below a first threshold, each period of the PFM switching mode including an on-time during which the high-side transistor is on and the low-side transistor is off, an off-time during which the low-side transistor is on and the high-side transistor is off and a HiZ-time during which the high-side transistor and the low-side transistor are both off; and
   vary the on-time of the PFM switching mode responsive to a change in the output current, by increasing the on-time of a PFM pulse from the preceding PFM pulse if the time between the PFM pulses is shorter than a first expected period and decreasing the on-time of the PFM pulse from the preceding PFM pulse if the time between the PFM pulses is longer than a second expected period.

5. The switching voltage regulator of claim 4, wherein the controller is operable to vary the on-time of the PFM switching mode so as to maintain, in the PFM switching mode, a fixed ratio between a peak current of the inductor and the output current without measuring the actual output current or inductor current.

6. The switching voltage regulator of claim 4, wherein the controller is operable to fix the on-time of the PFM switching mode responsive to the HiZ-time, frequency or period of the PM switching mode increasing to a maximum threshold above which the on-time remains constant.

7. The switching voltage regulator of claim 4, wherein the switching voltage regulator is a multi-phase switching voltage regulator and the power stage is one phase of the multi-phase switching voltage regulator.

* * * * *